United States Patent
Li et al.

(10) Patent No.: US 12,368,490 B2
(45) Date of Patent: Jul. 22, 2025

(54) DIRECTIONAL SENSING SIGNAL REQUEST

(71) Applicant: QUALCOMM Incorporated, San Diego, CA (US)

(72) Inventors: Qiaoyu Li, Beijing (CN); Min Huang, Beijing (CN); Chao Wei, Beijing (CN); Yu Zhang, San Diego, CA (US); Hao Xu, Beijing (CN); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/997,917

(22) PCT Filed: Jun. 30, 2020

(86) PCT No.: PCT/CN2020/099145
§ 371 (c)(1),
(2) Date: Nov. 3, 2022

(87) PCT Pub. No.: WO2022/000236
PCT Pub. Date: Jan. 6, 2022

(65) Prior Publication Data
US 2023/0155663 A1    May 18, 2023

(51) Int. Cl.
*H04B 7/06* (2006.01)
*G01S 7/00* (2006.01)
*G01S 13/00* (2006.01)

(52) U.S. Cl.
CPC ............ *H04B 7/0695* (2013.01); *G01S 7/006* (2013.01); *G01S 13/003* (2013.01)

(58) Field of Classification Search
CPC ..... G01S 13/003; G01S 7/006; H04B 7/0695; H04B 7/088; H04L 5/0023
See application file for complete search history.

(56) References Cited

U.S. PATENT DOCUMENTS

| 10,904,773 | B2 | 1/2021 | Malik et al. |
| 2018/0279134 | A1 | 9/2018 | Malik et al. |

(Continued)

FOREIGN PATENT DOCUMENTS

| CN | 108419266 A | 8/2018 |
| WO | 2019055315 | 3/2019 |

(Continued)

OTHER PUBLICATIONS

NATO STO: "Passive Coherent Locator History and Fundamentals", STO-EN-SET-243, Aug. 23, 2017, pp. 1-12, XP055733548, p. 5-p. 6.

(Continued)

*Primary Examiner* — Timothy X Pham
(74) *Attorney, Agent, or Firm* — Harrity & Harrity, LLP (57) ABSTRACT

Various aspects of the present disclosure generally relate to wireless communication. In some aspects, a user equipment (UE) may receive a first sensing signal transmitted by a base station. The UE may determine a preferred sensing direction for a second sensing signal based at least in part on the first sensing signal. The UE may transmit a directional sensing signal request to the base station. The directional sensing signal request may include information indicating the preferred sensing direction for the second sensing signal. Numerous other aspects are provided.

30 Claims, 6 Drawing Sheets

(56) References Cited

U.S. PATENT DOCUMENTS

| | | |
|---|---|---|
| 2019/0357159 A1 | 11/2019 | Pan et al. |
| 2019/0380054 A1 | 12/2019 | Manolakos et al. |
| 2020/0113010 A1 | 4/2020 | John Wilson et al. |
| 2020/0154474 A1* | 5/2020 | Lo .................... H04W 72/56 |
| 2023/0086144 A1* | 3/2023 | Roy ...................... H04L 5/005 |
| 2024/0171227 A1* | 5/2024 | Feng ................. H04B 7/0686 |

FOREIGN PATENT DOCUMENTS

| | | |
|---|---|---|
| WO | 2019056182 A1 | 3/2019 |
| WO | 2019157753 A1 | 8/2019 |

OTHER PUBLICATIONS

Supplementary European Search Report—EP20943357—Search Authority—Munich—Mar. 11, 2024.
International Search Report and Written Opinion—PCT/CN2020/099145—ISA/EPO—Mar. 25, 2021.
Lenovo: "Comparison of Beam-Selection and PMI-Based Schemes for NR MIMO," 3GPP TSG RAN WG1 Meeting #86, R1-167520, Aug. 22-26, 2016 (Aug. 26, 2016), the whole document, 5 pages.

* cited by examiner

DIRECTIONAL SENSING SIGNAL REQUEST

CROSS-REFERENCE TO RELATED APPLICATION

This Patent Application is a 371 National Phase of PCT Patent Application No. PCT/CN2020/099145, filed Jun. 30, 2020, entitled "DIRECTIONAL SENSING SIGNAL REQUEST," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with a directional sensing signal request.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: receiving a first sensing signal transmitted by a base station; determining a preferred sensing direction for a second sensing signal based at least in part on the first sensing signal; and transmitting a directional sensing signal request to the base station, the directional sensing signal request including information indicating the preferred sensing direction for the second sensing signal.

In some aspects, a method of wireless communication performed by a base station includes: transmitting a first sensing signal; receiving a directional sensing signal request from a UE, the directional sensing signal request including information indicating a preferred sensing direction for a second sensing signal; and transmitting the second sensing signal based at least in part on the directional sensing signal request.

In some aspects, a UE for wireless communication includes: a memory; and one or more processors operatively coupled to the memory, the memory and the one or more processors configured to: receive a first sensing signal transmitted by a base station; determine a preferred sensing direction for a second sensing signal based at least in part on the first sensing signal; and transmit a directional sensing signal request to the base station, the directional sensing signal request including information indicating the preferred sensing direction for the second sensing signal.

In some aspects, a base station for wireless communication includes: a memory; and one or more processors operatively coupled to the memory, the memory and the one or more processors configured to: transmit a first sensing signal; receive a directional sensing signal request from a UE, the directional sensing signal request including information indicating a preferred sensing direction for a second sensing signal; and transmit the second sensing signal based at least in part on the directional sensing signal request.

In some aspects, a non-transitory computer-readable medium storing one or more instructions for wireless communication includes: one or more instructions that, when executed by one or more processors of a UE, cause the one or more processors to: receive a first sensing signal transmitted by a base station; determine a preferred sensing direction for a second sensing signal based at least in part on the first sensing signal; and transmit a directional sensing signal request to the base station, the directional sensing signal request including information indicating the preferred sensing direction for the second sensing signal.

In some aspects, a non-transitory computer-readable medium storing one or more instructions for wireless communication includes: one or more instructions that, when executed by one or more processors of a base station, cause the one or more processors to: transmit a first sensing signal; receive a directional sensing signal request from a UE, the directional sensing signal request including information indicating a preferred sensing direction for a second sensing signal; and transmit the second sensing signal based at least in part on the directional sensing signal request.

In some aspects, an apparatus for wireless communication includes: means for receiving a first sensing signal transmitted by a base station; means for determining a preferred sensing direction for a second sensing signal based at least in part on the first sensing signal; and means for transmitting a directional sensing signal request to the base station, the directional sensing signal request including information indicating the preferred sensing direction for the second sensing signal.

In some aspects, an apparatus for wireless communication includes: means for transmitting a first sensing signal; means for receiving a directional sensing signal request from a UE, the directional sensing signal request including information indicating a preferred sensing direction for a second sensing signal; and means for transmitting the second sensing signal based at least in part on the directional sensing signal request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
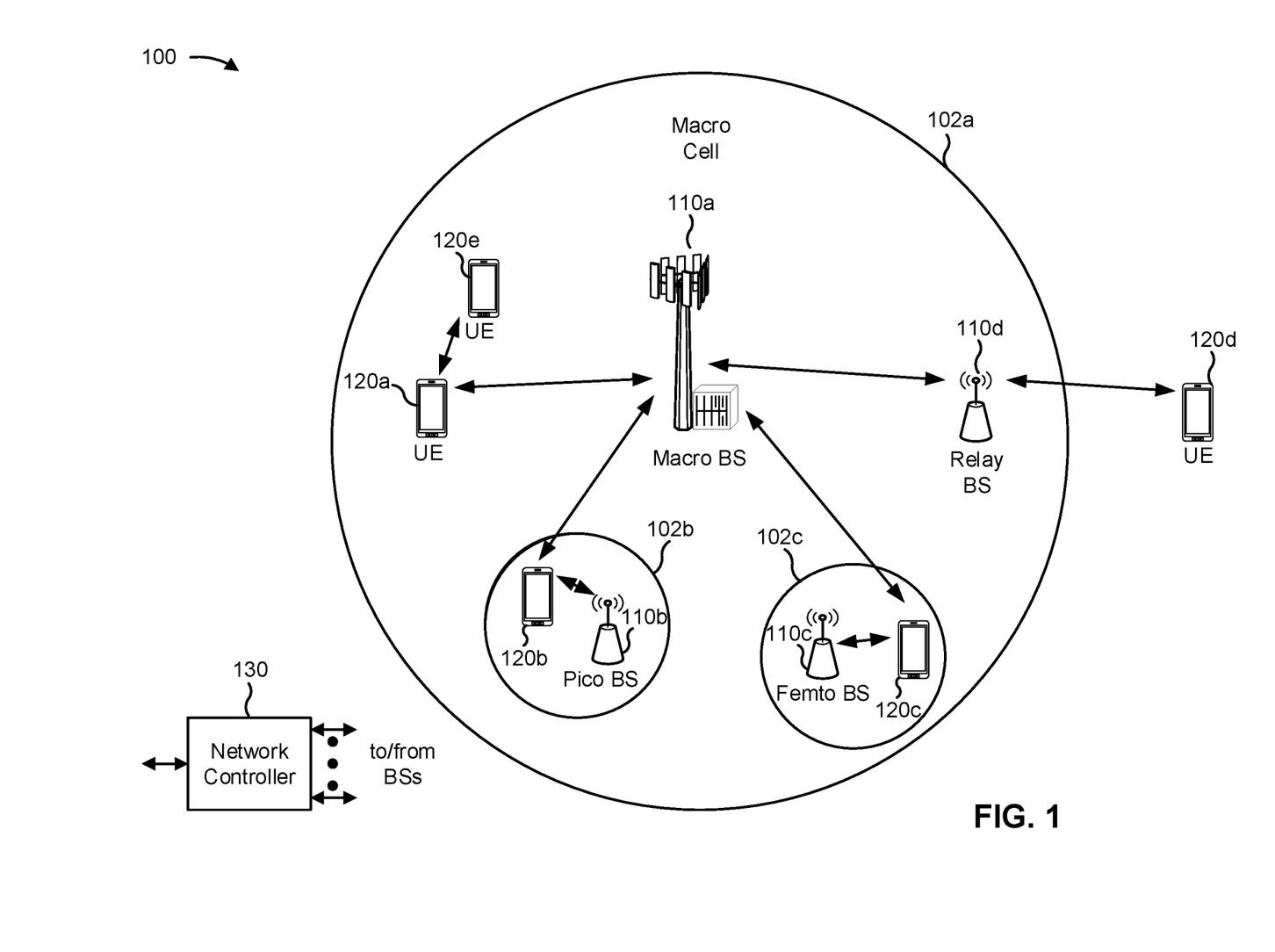
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
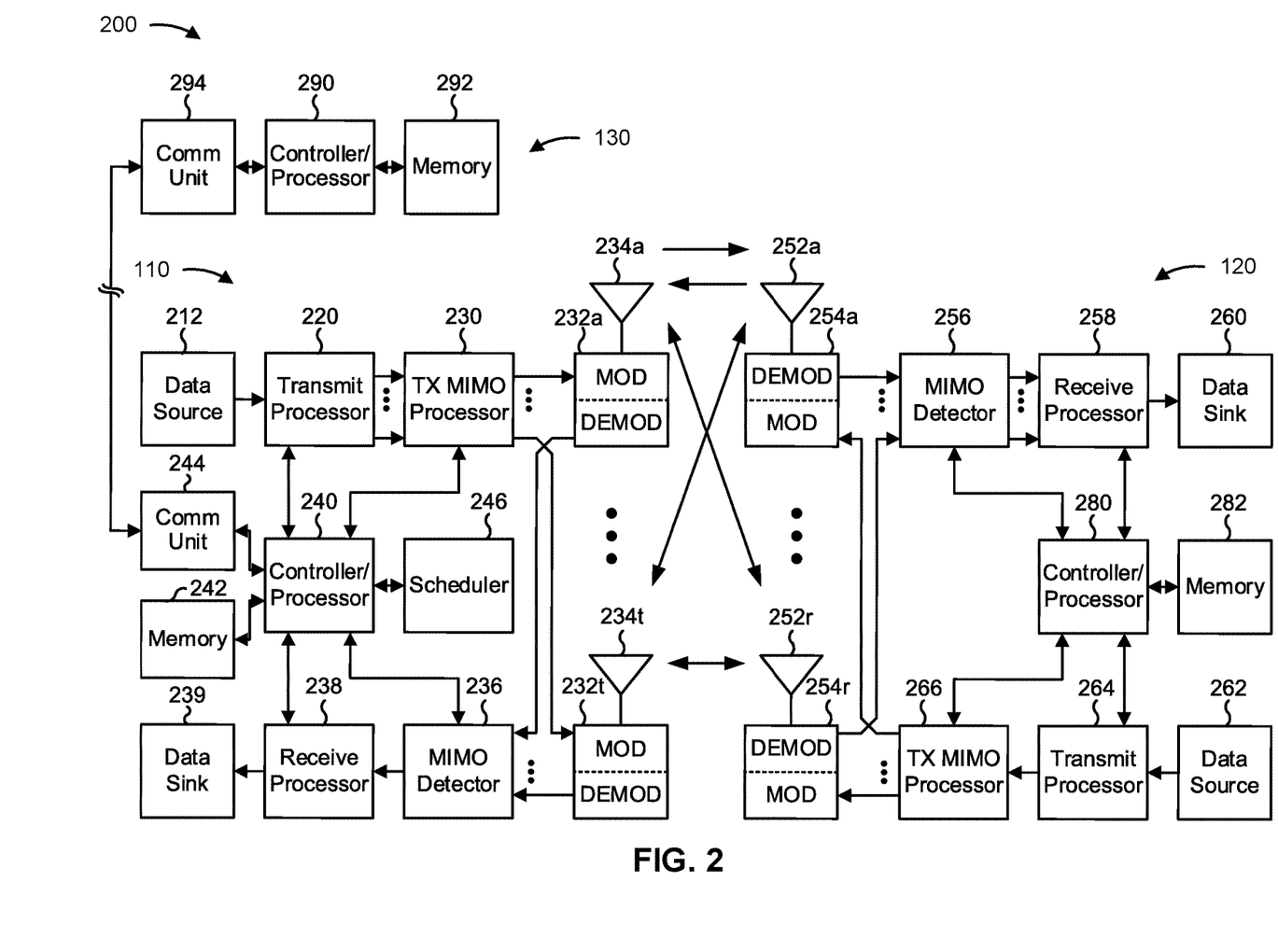
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A, 3B, 4A, 4B, 5 and 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A, 3B, 4A, 4B, 5 and 6.

Controller/processor 240 of base station 110, controller/processor 280 of UE 120, and/or any other component(s) of FIG. 2 may perform one or more techniques associated with a directional sensing signal request, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, a receiver, such as a UE 120 or a base station 110, may include means for receiving a first sensing signal transmitted by a sensing signal transmitter; means for determining a preferred sensing direction for a second sensing signal based at least in part on the first sensing signal; means for transmitting a directional sensing signal request to the sensing signal transmitter, the directional sensing signal request including information indicating the preferred sensing direction for the second sensing signal; and/or the like. In some aspects, when the receiver includes a UE 120, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, when the receiver includes a base station 110, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a transmitter, such as a UE 120 or a base station 110, may include means for transmitting a first sensing signal; means for receiving a directional sensing signal request from a sensing signal receiver, the directional sensing signal request including information indicating a preferred sensing direction for a second sensing signal; means for transmitting the second sensing signal based at least in part on the directional sensing signal request; and/or the like. In some aspects, when the transmitter includes a UE 120, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, when the transmitter includes a base station 110, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some wireless networks may use wireless communication devices to jointly perform sensing services and communication services (sometimes referred to as joint SensComm services). The sensing services may include object detection that may be used, for example, to improve the communication services or to improve other services. For example, a UE that receives a sensing signal may use the sensing signal to detect objects for a service such as an assisted driving service, an autonomous vehicle service, and/or the like. In practice, joint SensComm may provide a number of advantages, such as a lower cost with additional services (e.g., NR infrastructure can be reused), a reduced device size, reduced power consumption, spectrum sharing, improved performance (e.g., improved coverage and/or improved resolution), improved safety (e.g., due to enhanced information sharing), and/or the like.

In some deployments, passive sensing (also referred to as bi-static or multi-static sensing) may be utilized for providing a sensing service. In a passive sensing scheme, a transmitter (e.g., a terrestrial broadcast transmitter, a cellular communications transmitter, and/or the like) may be configured to opportunistically transmit sensing signals, and a receiver may be located remote from the transmitter. In the passive sensing scenario, when the transmitter transmits a sensing signal, the receiver may receive both a line-of-sight (LoS) signal (i.e., the receiver may receive the sensing signal directly from the transmitter without reflection) and one or more signals reflected from one or more objects (i.e., the receiver may receive the sensing signal after reflection of the signal from the one or more objects). Here, the LoS signal may be used as a reference signal and can be correlated with the one or more reflected signals in association with detecting objects. For example, a delay derived from a correlation maximum associated with a given reflected signal defines an ellipse, and that ellipse describes possible positions of an object relative to the transmitter and the receiver. Notably, a passive sensing scheme differs from a mono-static scheme in that, in the mono-static scheme, the transmitter and the receiver are located at the same location (e.g., on the same wireless communication device). In some cases, a multi-node passive sensing scheme can be used (e.g., a scheme in which multiple transmitters each transmit sensing signals for reception by a given remote receiver). The multi-node passive sensing scheme can provide, for example, enhanced spatial diversity, improved angular resolution, improved target identifiability (e.g., for low-Doppler targets), and/or the like.

In practice, sensing resolution can be improved by increasing radio resources used by a sensing signal (e.g., by increasing a bandwidth of the sensing signal in the frequency domain, by increasing a period of the sensing signal in the time domain, and/or the like). However, limiting frequency, time, and/or spatial resources used for a sensing signal may be desirable to, for example, ensure that sufficient resources are available for communication signals. Therefore, it may not be practical to use, for example, an ultra-wideband signal for sensing in most scenarios.

Some aspects described herein provide techniques and apparatuses associated with a directional sensing signal request. In some aspects, a receiver may receive a first sensing signal transmitted by a transmitter and may determine a preferred sensing direction for a second sensing signal based at least in part on the first sensing signal. Here, the preferred sensing direction may correspond to a direction of a possible object detected based at least in part on the first sensing signal. In some aspects, the receiver may transmit (e.g., via a communication link) a directional sensing signal request to the transmitter, where the directional sensing signal request includes information indicating the preferred sensing direction for the second sensing signal. The transmitter may then transmit the second signal based at least in part on the directional sensing signal request, and the receiver may receive the second sensing signal accordingly.

In some aspects, the directional sensing signal request may be used to indicate a preferred multipath and/or a preferred beam direction determined by the receiver based at least in part on the first sensing signal. Based at least in part on the request, the transmitter can transmit, and the receiver can receive, a refined sensing signal (e.g., using an ultra-wideband and/or one or more comparatively narrower beams) that allows the receiver to achieve improved resolution in association with sensing the object. That is, a beam of the second sensing signal may be comparatively narrower than a beam of the first sensing signal, meaning that a comparatively rough beam can be used for initial sensing, while a comparatively refined beam can be used for further sensing.

Notably, the term "sensing signal," as used herein, may refer to a signal that can be used for target detection, object detection, and/or the like.

Figure 3A:
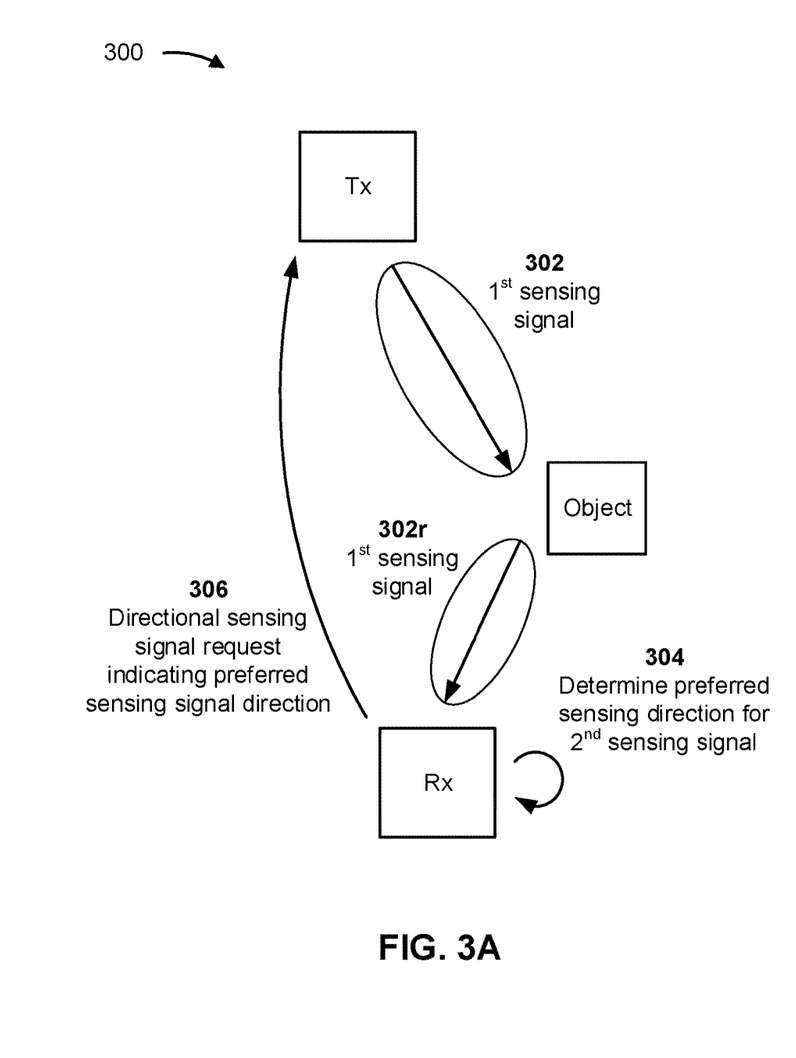
FIGS. 3A and 3B are diagrams illustrating an example associated with a directional sensing signal request, in accordance with various aspects of the present disclosure.
Figure 3B:
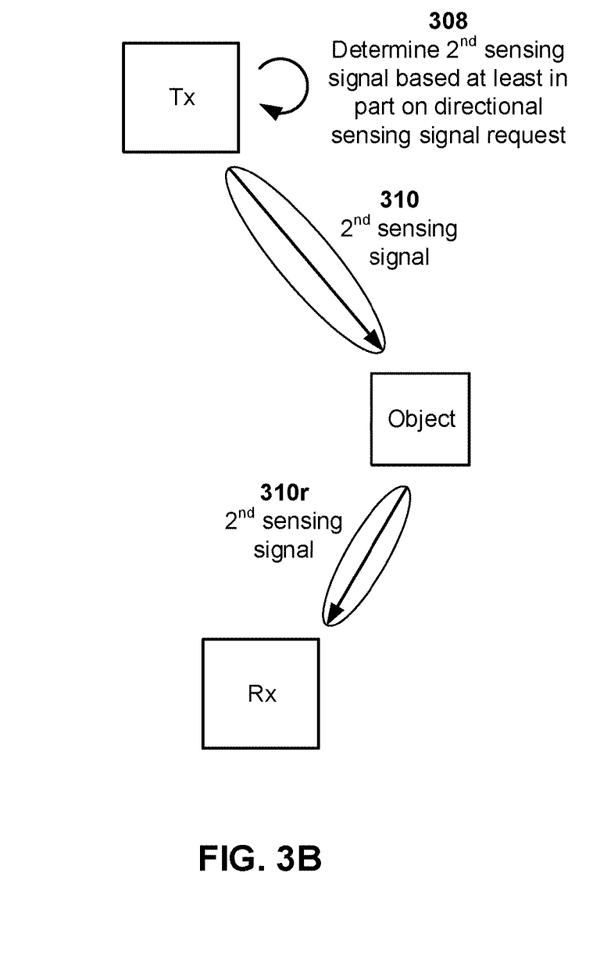

FIGS. 3A and 3B are diagrams illustrating an example 300 associated with a directional sensing signal request that uses a delay-tap based approach, in accordance with various aspects of the present disclosure. As shown in FIGS. 3A and 3B, example 300 includes a transmitter (e.g., a base station 110, a UE 120, and/or the like) and a receiver (e.g., a UE 120, a base station 110, and/or the like). As further shown, an object may be located relative to the transmitter and the receiver such that the object can be detected by the receiver based at least in part on a sensing signal transmitted by the transmitter. Notably, while a passive sensing scheme is illustrated in example 300, the techniques described in association with example 300 may be applied to another type of sensing scheme, such as a multi-node passive sensing scheme or an active (i.e., mono-static) sensing scheme.

As shown in FIG. 3A by reference 302, the transmitter may transmit a first sensing signal. In some aspects, the first sensing signal may be a signal to be used for object detection (rather than a signal to be used for communication). In some aspects, the first sensing signal may be a pulsed signal, a frequency-modulated continuous wave (FMCW) signal, a phase-modulated continuous wave (PMCW) signal, and/or another type of signal that can be used for object detection. As shown in example 300, in some aspects, the first sensing signal may be transmitted with a relatively small bandwidth and/or a relatively wide beam (e.g., a relatively wide spatial footprint). In some aspects, a first sensing signal transmitted with a relatively small bandwidth and/or a relatively wide beam allows the receiver to detect possible objects in one or more delay taps. However, an achievable range-resolution may be relatively low (e.g., 10 meters). That is, the first sensing signal may enable the receiver to observe one or more possible objects in one or more delay taps, but range resolution of the one or more possible objects may be poor (such that refined sensing is desirable). In example 300, as shown in FIG. 3A by reference 302r, the first sensing signal (e.g., some portion of the first sensing signal) is reflected by the object such that the receiver receives the first sensing signal (e.g., at least a portion of the first sensing signal).

As shown by reference 304, the receiver may determine a preferred sensing direction for a second sensing signal based at least in part on the first sensing signal. In some aspects, the preferred sensing direction corresponds to a direction of a possible object detected based at least in part on the first sensing signal. In some aspects, the preferred sensing direction may be used in association with a transmission of the second sensing signal by the transmitter to enable refined sensing of the object, as described below. In example 300, the preferred sensing direction corresponds to a direction of the object (e.g., a spatial direction relative to the receiver). In some aspects, the receiver may detect the object and determine the direction of the object based at least in part on the first sensing signal (e.g., by processing the first sensing signal according to an object detection algorithm configured on the receiver).

As shown by reference 306, the receiver may transmit, and the transmitter may receive, a directional sensing signal request. In some aspects, the directional sensing signal request includes information indicating the preferred sensing direction for the second sensing signal. In some aspects, the receiver may transmit, and the transmitter may receive, the directional sensing signal request via a communication link between the receiver and the transmitter (e.g., a wireless communication link between the receiver and the transmitter).

In some aspects, the information indicating the preferred sensing direction for the second sensing signal may include precoding information associated with one or more delay-tap indices. Here, each of the one or more delay-tap indices is associated with a respective delay-tap in a set of delay-taps. For example, in example 300, a delay-tap corresponding the object (e.g., a path of the first sensing signal from the transmitter to the object to the receiver) may be associated with a particular delay-tap index. Here, the information indicating the preferred sensing direction may include precoding information associated with the delay-tap index. In some aspects, the information indicating the preferred sensing direction may include one or multiple delay-tap indices, each associated with a different delay-tap. In some aspects, each delay-tap index may be associated with a respective observation in a set of observations of the first sensing signal in a different time domain resource. That is, in some aspects, the receiver may provide precoding information with respect to one or more delay-tap indices, where multiple delay-tap indices correspond to multiple sensing signal observations acquired in different resources in the time domain.

In some aspects, the precoding information may include a set of precoding matrix indicators (PMIs) determined based at least in part on a Type-II channel state information (CSI) codebook (e.g., a Release 16 Type-II CSI codebook). In some aspects, each PMI of the set of PMIs may be associated with a respective delay-tap in the set of delay-taps. That is, in some aspects, delay-tap specific PMIs can be used (e.g., based at least in part on the Release 16 Type-II CSI codebook), where the receiver able to determine the delay-tap to be reported in a CSI report (i.e., by removing the sliding window on the discrete Fourier transform (DFT) bases). Notably, this differs from Release 16 Type-II CSI, where a base station is always able to use a sliding window on the DFT bases to determine a number of delay taps that can be reported by a UE. In some aspects, a quantization granularity of each delay-tap of the set of delay-taps may be based at least in part on a quantity of delay-taps in the set of delay-taps. That is, the receiver may determine the quantization granularity of each delay-tap based at least in part on the number of delay taps that the receiver would report. Notably, this also differs from Release 16 Type-II CSI, where the quantization granularity and the number of delay taps to be reported is fixed by a base station.

As shown in FIG. 3B by reference 308, the transmitter may determine one or more parameters for the second sensing signal based at least in part on the directional sensing signal request. The one or more parameters may include, for example, a spatial direction of the second sensing signal, a bandwidth for the second sensing signal, a beam footprint for the second sensing signal, and/or the like. In some aspects, the transmitter may determine the one or more parameters of the second sensing signal based at least in part on the preferred sensing direction indicated by the directional sensing signal request.

As shown by reference 310, the transmitter may transmit the second sensing signal. In some aspects, the second sensing signal may be a signal to be used for refined object detection (as compared to the first sensing signal). In some aspects, the second sensing signal may be a pulsed signal, an FMCW signal, a PMCW signal, and/or another type of signal that can be used for object detection. In some aspects, a bandwidth of the second sensing signal may be larger than a bandwidth of the first sensing signal. For example, the first sensing signal may be transmitted with a narrow bandwidth, while the second sensing signal may be transmitted with an ultra-wide bandwidth. In some aspects, the second sensing signal may be comparatively narrower than the first sensing signal. That is, in some aspects, a beam footprint of the second sensing signal may be narrower than a beam footprint of the first sensing signal, as indicated by comparing FIGS. 3A and 3B.

In some aspects, the second sensing signal may be transmitted with a relatively large bandwidth and/or a relatively narrow beam (e.g., a relatively narrow spatial footprint). In some aspects, the second sensing signal being transmitted with a relatively large bandwidth and/or a relatively narrow beam provides improved range-resolution (e.g., 1 meter) as compared to the first sensing signal. That is, the second sensing signal may enable the receiver to observe one or more objects with an improved range resolution. In example 300, as shown by reference 310r, the second sensing signal (e.g., some portion of the second sensing signal) is reflected by the object such that the receiver receives the second sensing signal (e.g., at least a portion of the second sensing signal). The receiver can then process the second sensing signal in association with determining information associated with the object, accordingly.

As indicated above, FIGS. 3A and 3B are provided as an example. Other examples may differ from what is described with respect to FIGS. 3A and 3B.

Figure 4A:
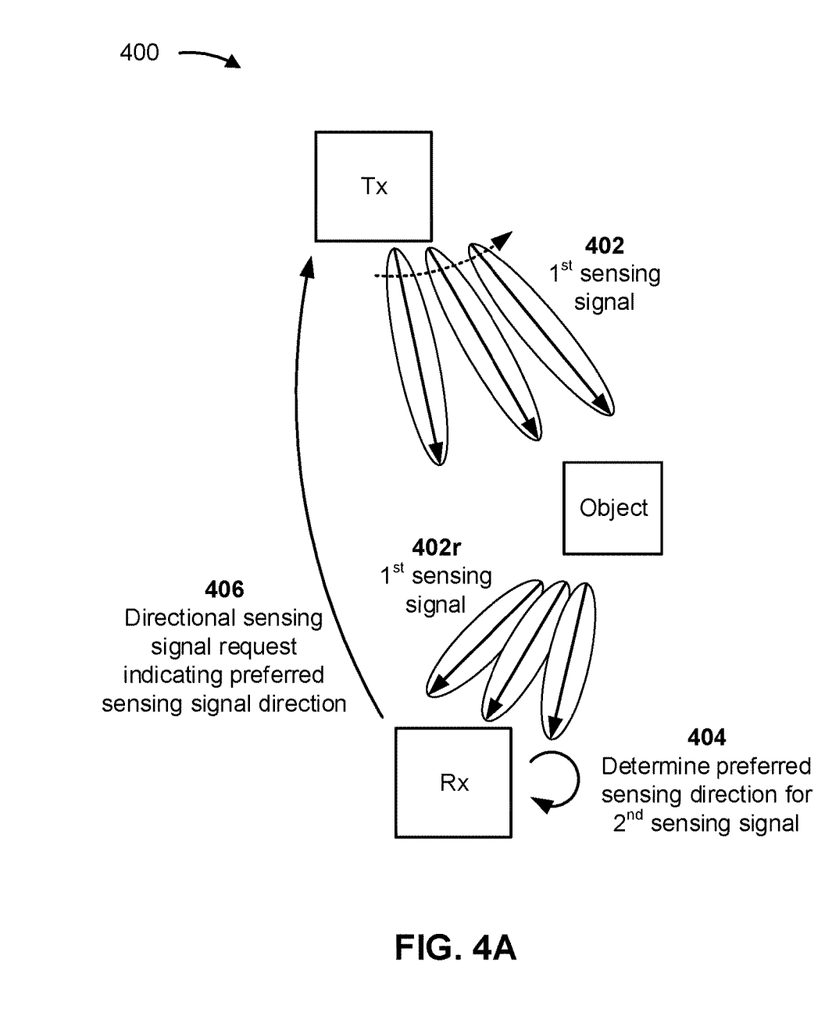
FIGS. 4A and 4B are diagrams illustrating another example associated with a directional sensing signal request, in accordance with various aspects of the present disclosure.
Figure 4B:
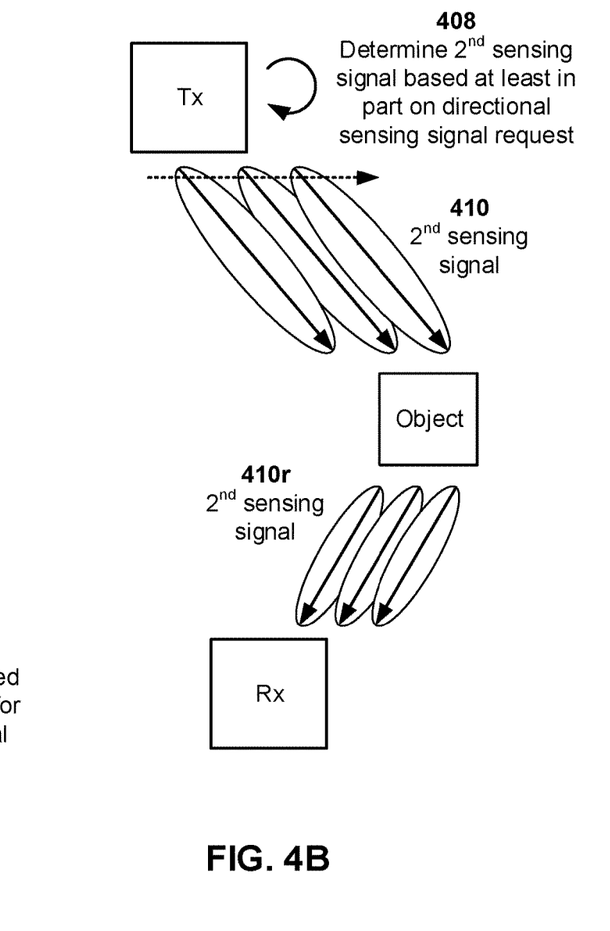

In some aspects, a delay-tap based approach may be utilized in association with providing the directional sensing signal request, as described above. In some other aspects, a beam-index based approach may be used. FIGS. 4A and 4B are diagrams illustrating an example 400 associated with a directional sensing signal request that uses a beam-index based approach, in accordance with various aspects of the present disclosure.

As shown in FIGS. 4A and 4B, example 400 includes the transmitter (e.g., a base station 110, a UE 120, and/or the like) and the receiver (e.g., a UE 120, a base station 110, and/or the like) and the object located relative to the transmitter and the receiver such that the object can be detected by the receiver based at least in part on a sensing signal transmitted by the transmitter. Notably, while a passive sensing scheme is illustrated in example 400, the techniques described in association with example 400 may be applied to another type of sensing scheme, such as a multi-node passive sensing scheme or an active (i.e., mono-static) sensing scheme.

As shown in FIG. 4A by reference 402, the transmitter may transmit a first sensing signal. In some aspects, the first sensing signal may be a signal to be used for object detection (rather than a signal to be used for communication), as described above. As shown in example 400, in some aspects, the first sensing signal may be transmitted such that the first sensing signal is rotated across multiple beams over a period of time (e.g., via a CSI reference signal, a synchronization signal block, another reference signal, and/or the like). As indicated in example 400, each of the multiple beams associated with the first sensing signal may have a different spatial direction. In example 400, as shown in FIG. 4A by reference 402r, the first sensing signal (e.g., some portion of the first sensing signal) is reflected by the object such that the receiver receives the first sensing signal (e.g., at least a portion of the first sensing signal).

As shown by reference 404, the receiver may determine a preferred sensing direction for a second sensing signal based at least in part on the first sensing signal. In some aspects, the receiver may determine the preferred sensing direction in the manner described above in association with example 300.

As shown by reference 406, the receiver may transmit, and the transmitter may receive, a directional sensing signal request. In some aspects, the directional sensing signal request includes information indicating the preferred sensing direction for the second sensing signal. In some aspects, the receiver may transmit, and the transmitter may receive, the directional sensing signal request via a communication link between the receiver and the transmitter (e.g., a wireless communication link between the receiver and the transmitter).

In some aspects, the information indicating the preferred sensing direction for the second sensing signal may include a beam index, where the beam index corresponds to a particular one of the multiple beams of the first sensing signal. In some aspects, the beam index identifies a beam with the preferred sensing direction such that, by including the beam index in the directional sensing signal request, the receiver indicates the preferred sensing direction for the second sensing signal. In some aspects, the directional sensing signal request may include one or more beam indices.

As shown in FIG. 4B by reference 408, the transmitter may determine one or more parameters for the second sensing signal based at least in part on the directional sensing signal request. In some aspects, the transmitter may determine the one or more parameters for the second sensing signal based at least in part on the beam index. For example, the transmitter may identify the beam indicated by the directional sensing signal request, and may identify the one or more parameters for the second sensing signal based at least in part on the identified beam (e.g., such that the second sensing signal has one or more characteristics matching those of the beam).

As shown by reference 410, the transmitter may transmit the second sensing signal. In some aspects, the second sensing signal may be a signal to be used for refined object detection (as compared to the first sensing signal), as described above. In some aspects, the second sensing signal may be transmitted such that a direction of the second sensing signal is constant over a period of time. In example 400, as shown by reference 410r, the second sensing signal (e.g., some portion of the second sensing signal) is reflected by the object such that the receiver receives the second sensing signal (e.g., at least a portion of the second sensing signal). The receiver can then process the second sensing signal in association with determining information associated with the object, accordingly.

As indicated above, FIGS. 4A and 4B are provided as an example. Other examples may differ from what is described with respect to FIGS. 4A and 4B.

Figure 5:
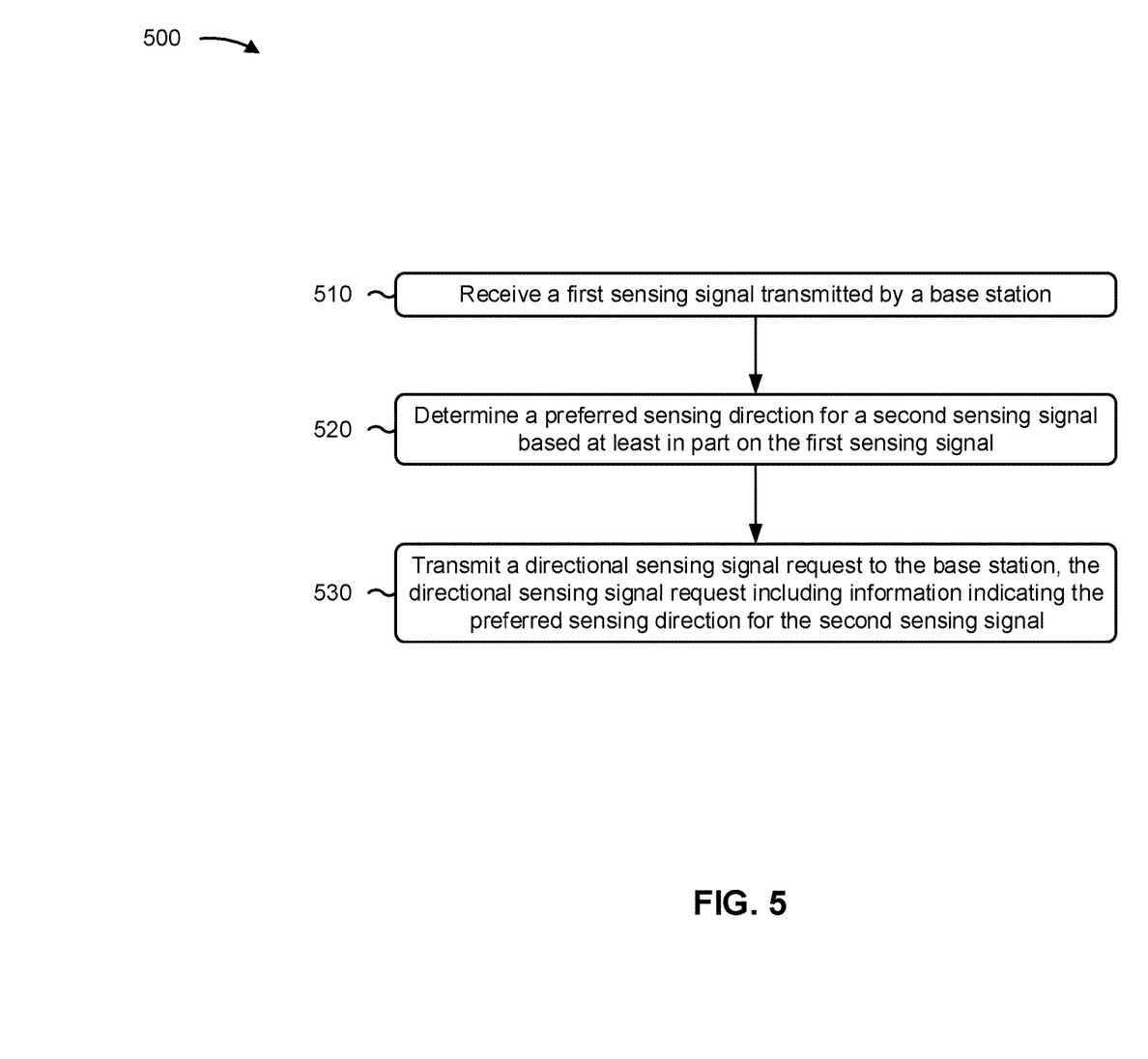
FIGS. 5 and 6 are diagrams illustrating example processes associated with a directional sensing signal request, in accordance with various aspects of the present disclosure.

FIG. 5 is a diagram illustrating an example process 500 performed, for example, by a receiver, in accordance with various aspects of the present disclosure. Example process 500 is an example where the receiver (e.g., a UE 120, a base station 110, and/or the like) performs operations associated with a directional sensing signal request.

As shown in FIG. 5, in some aspects, process 500 may include receiving a first sensing signal transmitted by a transmitter (block 510). For example, the receiver (e.g., using receive processor 258, controller/processor 280, memory 282, and/or the like when the receiver is a UE 120; using receive processor 238, controller/processor 240, memory 242, and/or the like when the receiver is a base station 110) may receive a first sensing signal transmitted by a transmitter (e.g., a base station 110, a UE 120, and/or the like), as described above.

As further shown in FIG. 5, in some aspects, process 500 may include determining a preferred sensing direction for a second sensing signal based at least in part on the first sensing signal (block 520). For example, the receiver (e.g., using receive processor 258, transmit processor 264, controller/processor 280, memory 282, and/or the like when the receiver is a UE 120; using transmit processor 220, receive processor 238, controller/processor 240, memory 242, and/or the like when the receiver is a base station 110) may determine a preferred sensing direction for a second sensing signal based at least in part on the first sensing signal, as described above.

As further shown in FIG. 5, in some aspects, process 500 may include transmitting a directional sensing signal request to the transmitter, the directional sensing signal request including information indicating the preferred sensing direction for the second sensing signal (block 530). For example, the receiver (e.g., using transmit processor 264, controller/processor 280, memory 282, and/or the like when the receiver is a UE 120; using transmit processor 220, controller/processor 240, memory 242, and/or the like when the receiver is a base station 110) may transmit a directional sensing signal request to the transmitter, the directional sensing signal request including information indicating the preferred sensing direction for the second sensing signal, as described above.

Process 500 may include additional aspects, such as any single aspect or any combination of aspects described below and/or in connection with one or more other processes described elsewhere herein.

In a first aspect, process 500 includes receiving the second sensing signal after transmitting the directional sensing signal request.

In a second aspect, alone or in combination with the first aspect, a bandwidth of the first sensing signal is smaller than a bandwidth of the second sensing signal.

In a third aspect, alone or in combination with one or more of the first and second aspects, a beam footprint of the first sensing signal is wider than a beam footprint of the second sensing signal.

In a fourth aspect, alone or in combination with one or more of the first through third aspects, the information indicating the preferred sensing direction for the second sensing signal includes precoding information associated with one or more delay-tap indices, each of the one or more delay-tap indices being associated with a respective delay-tap in a set of delay-taps.

In a fifth aspect, alone or in combination with one or more of the first through fourth aspects, each delay-tap index of the one or more delay-tap indices is associated with a respective observation in a set of observations of the first sensing signal in a different time domain resource.

In a sixth aspect, alone or in combination with one or more of the first through fifth aspects, the precoding information includes a set of PMIs determined based at least in part on a Type-II CSI codebook, each of the set of PMIs being associated with a respective delay-tap in the set of delay-taps.

In a seventh aspect, alone or in combination with one or more of the first through sixth aspects, a quantization granularity of each delay-tap of the set of delay-taps is based at least in part on a quantity of delay-taps in the set of delay-taps.

In an eighth aspect, alone or in combination with one or more of the first through seventh aspects, the first sensing signal is rotated across a plurality of beams in a time domain, each beam of the plurality of beams having a different spatial direction.

In a ninth aspect, alone or in combination with one or more of the first through eighth aspects, the information indicating the preferred sensing direction for the second sensing signal includes one or more beam indices, each of the one or more beam indices corresponding to a beam of the plurality of beams.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
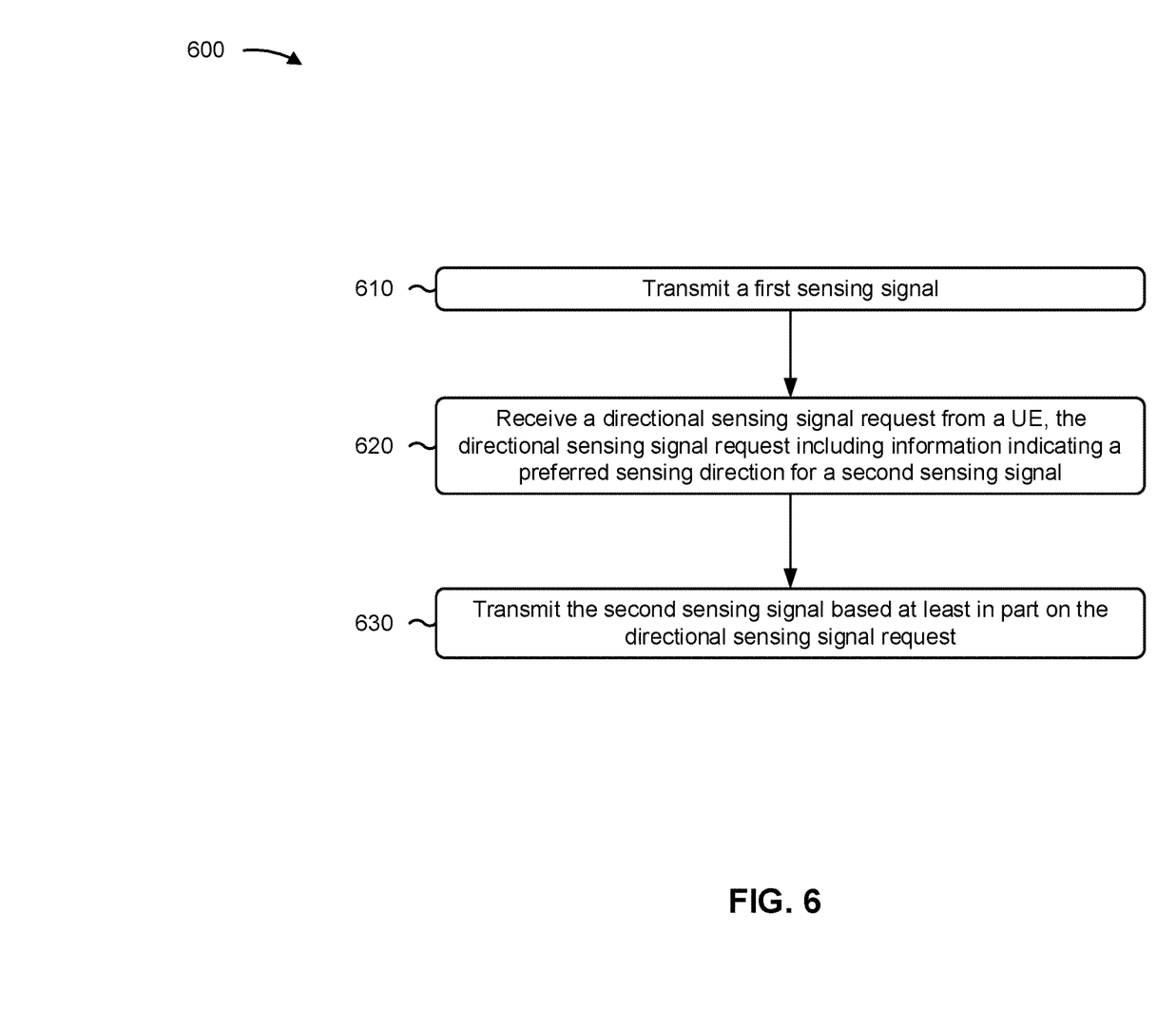

FIG. 6 is a diagram illustrating an example process 600 performed, for example, by a transmitter, in accordance with various aspects of the present disclosure. Example process 600 is an example where the transmitter (e.g., a base station 110, a UE 120, and/or the like) performs operations associated with a directional sensing signal request.

As shown in FIG. 6, in some aspects, process 600 may include transmitting a first sensing signal (block 610). For example, the transmitter (e.g., using transmit processor 220, controller/processor 240, memory 242, and/or the like when the transmitter is a base station 110; using transmit processor 264, controller/processor 280, memory 282, and/or the like when the transmitter is a UE 120) may transmit a first sensing signal, as described above.

As further shown in FIG. 6, in some aspects, process 600 may include receiving a directional sensing signal request from a receiver, the directional sensing signal request including information indicating a preferred sensing direction for a second sensing signal (block 620). For example, the transmitter (e.g., using receive processor 238, controller/processor 240, memory 242, and/or the like when the transmitter is a base station 110; using receive processor 258, controller/processor 280, memory 282, and/or the like when the transmitter is a UE 120) may receive a directional sensing signal request from a receiver, the directional sensing signal request including information indicating a preferred sensing direction for a second sensing signal, as described above.

As further shown in FIG. 6, in some aspects, process 600 may include transmitting the second sensing signal based at least in part on the directional sensing signal request (block 630). For example, the transmitter (e.g., using transmit processor 220, controller/processor 240, memory 242, and/or the like when the transmitter is a base station 110; using transmit processor 264, controller/processor 280, memory 282, and/or the like when the transmitter is a UE 120) may transmit the second sensing signal based at least in part on the directional sensing signal request, as described above.

Process 600 may include additional aspects, such as any single aspect or any combination of aspects described below and/or in connection with one or more other processes described elsewhere herein.

In a first aspect, a bandwidth of the first sensing signal is smaller than a bandwidth of the second sensing signal.

In a second aspect, alone or in combination with the first aspect, a beam footprint of the first sensing signal is wider than a beam footprint of the second sensing signal.

In a third aspect, alone or in combination with one or more of the first and second aspects, the information indicating the preferred sensing direction for the second sensing signal includes precoding information associated with one or more delay-tap indices, each of the one or more delay-tap indices being associated with a respective delay-tap in a set of delay-taps.

In a fourth aspect, alone or in combination with one or more of the first through third aspects, each delay-tap index of the one or more delay-tap indices is associated with a respective observation in a set of observations of the first sensing signal in a different time domain resource.

In a fifth aspect, alone or in combination with one or more of the first through fourth aspects, the precoding information includes a set of PMIs determined based at least in part on a Type-II CSI codebook, each of the set of PMIs being associated with a respective delay-tap in the set of delay-taps.

In a sixth aspect, alone or in combination with one or more of the first through fifth aspects, a quantization granularity of each delay-tap of the set of delay-taps is based at least in part on a quantity of delay-taps in the set of delay-taps.

In a seventh aspect, alone or in combination with one or more of the first through sixth aspects, the first sensing signal is rotated across a plurality of beams in a time domain, each beam of the plurality of beams having a different spatial direction.

In an eighth aspect, alone or in combination with one or more of the first through seventh aspects, the information indicating the preferred sensing direction for the second sensing signal includes one or more beam indices, each of the one or more beam indices corresponding to a beam of the plurality of beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a first sensing signal transmitted by a network entity;
    determining a preferred sensing direction for a second sensing signal based at least in part on the first sensing signal; and
    transmitting a directional sensing signal request to the network entity, the directional sensing signal request including information indicating the preferred sensing direction for the second sensing signal, wherein the information indicating the preferred sensing direction for the second sensing signal includes precoding information associated with one or more delay-tap indices, each of the one or more delay-tap indices being associated with a respective delay-tap in a set of delay-taps.

2. The method of claim 1, further comprising receiving the second sensing signal after transmitting the directional sensing signal request.

3. The method of claim 1, wherein a bandwidth of the first sensing signal is smaller than a bandwidth of the second sensing signal.

4. The method of claim 1, wherein a beam footprint of the first sensing signal is wider than a beam footprint of the second sensing signal.

5. The method of claim 1, wherein each delay-tap index of the one or more delay-tap indices is associated with a respective observation in a set of observations of the first sensing signal in a different time domain resource.

6. The method of claim 1, wherein the precoding information includes a set of precoding matrix indicators (PMIs) determined based at least in part on a Type-II channel state information (CSI) codebook, each of the set of PMIs being associated with a respective delay-tap in the set of delay-taps.

7. The method of claim 6, wherein a quantization granularity of each delay-tap of the set of delay-taps is based at least in part on a quantity of delay-taps in the set of delay-taps.

8. The method of claim 1, wherein the first sensing signal is rotated across a plurality of beams in a time domain, each beam of the plurality of beams having a different spatial direction.

9. The method of claim 8, wherein the information indicating the preferred sensing direction for the second sensing signal includes one or more beam indices, each of the one or more beam indices corresponding to a beam of the plurality of beams.

10. A method of wireless communication performed by a network entity, comprising:
transmitting a first sensing signal;
receiving a directional sensing signal request from a user equipment (UE), the directional sensing signal request including information indicating a preferred sensing direction for a second sensing signal, wherein the information indicating the preferred sensing direction for the second sensing signal includes precoding information associated with one or more delay-tap indices, each of the one or more delay-tap indices being associated with a respective delay-tap in a set of delay-taps; and
transmitting the second sensing signal based at least in part on the directional sensing signal request.

11. The method of claim 10, wherein a bandwidth of the first sensing signal is smaller than a bandwidth of the second sensing signal.

12. The method of claim 10, wherein a beam footprint of the first sensing signal is wider than a beam footprint of the second sensing signal.

13. The method of claim 10, wherein each delay-tap index of the one or more delay-tap indices is associated with a respective observation in a set of observations of the first sensing signal in a different time domain resource.

14. The method of claim 10, wherein the precoding information includes a set of precoding matrix indicators (PMIs) determined based at least in part on a Type-II channel state information (CSI) codebook, each of the set of PMIs being associated with a respective delay-tap in the set of delay-taps.

15. The method of claim 14, wherein a quantization granularity of each delay-tap of the set of delay-taps is based at least in part on a quantity of delay-taps in the set of delay-taps.

16. The method of claim 10, wherein the first sensing signal is rotated across a plurality of beams in a time domain, each beam of the plurality of beams having a different spatial direction.

17. The method of claim 16, wherein the information indicating the preferred sensing direction for the second sensing signal includes one or more beam indices, each of the one or more beam indices corresponding to a beam of the plurality of beams.

18. A user equipment (UE) for wireless communication, comprising:
a memory; and
one or more processors coupled to the memory, the one or more processors configured to:
receive a first sensing signal transmitted by a network entity;
determine a preferred sensing direction for a second sensing signal based at least in part on the first sensing signal; and
transmit a directional sensing signal request to the network entity, the directional sensing signal request including information indicating the preferred sensing direction for the second sensing signal, wherein the information indicating the preferred sensing direction for the second sensing signal includes precoding information associated with one or more delay-tap indices, each of the one or more delay-tap indices being associated with a respective delay-tap in a set of delay-taps.

19. The UE of claim 18, wherein the one or more processors are further configured to receive the second sensing signal after transmitting the directional sensing signal request.

20. The UE of claim 18, wherein a bandwidth of the first sensing signal is smaller than a bandwidth of the second sensing signal or a beam footprint of the first sensing signal is wider than a beam footprint of the second sensing signal.

21. The UE of claim 18, wherein the first sensing signal is rotated across a plurality of beams in a time domain, each beam of the plurality of beams having a different spatial direction.

22. The UE of claim 21, wherein the information indicating the preferred sensing direction for the second sensing signal includes one or more beam indices, each of the one or more beam indices corresponding to a beam of the plurality of beams.

23. The UE of claim 21, wherein the information indicating the preferred sensing direction for the second sensing signal includes one or more beam indices, each of the one or more beam indices corresponding to a beam of the plurality of beams.

24. The UE of claim 18, wherein each delay-tap index of the one or more delay-tap indices is associated with a respective observation in a set of observations of the first sensing signal in a different time domain resource.

25. The UE of claim 18, wherein the precoding information includes a set of precoding matrix indicators (PMIs) determined based at least in part on a Type-II channel state information (CSI) codebook, each of the set of PMIs being associated with a respective delay-tap in the set of delay-taps.

26. The UE of claim 25, wherein a quantization granularity of each delay-tap of the set of delay-taps is based at least in part on a quantity of delay-taps in the set of delay-taps.

27. A network entity for wireless communication, comprising:
a memory; and
one or more processors coupled to the memory, the one or more processors configured to:
transmit a first sensing signal;
receive a directional sensing signal request from a user equipment (UE), the directional sensing signal request including information indicating a preferred sensing direction for a second sensing signal, wherein the information indicating the preferred sensing direction for the second sensing signal includes precoding information associated with one or more delay-tap indices, each of the one or more delay-tap indices being associated with a respective delay-tap in a set of delay-taps; and transmit the second sensing signal based at least in part on the directional sensing signal request.

28. The network entity of claim 27, wherein a bandwidth of the first sensing signal is smaller than a bandwidth of the second sensing signal or a beam footprint of the first sensing signal is wider than a beam footprint of the second sensing signal.

29. The network entity of claim 27, wherein the first sensing signal is rotated across a plurality of beams in a time domain, each beam of the plurality of beams having a different spatial direction.

30. The network entity of claim 29, wherein the information indicating the preferred sensing direction for the second sensing signal includes one or more beam indices, each of the one or more beam indices corresponding to a beam of the plurality of beams.

* * * * *